United States Patent [19]

Evans

[11] Patent Number: 5,317,722
[45] Date of Patent: * May 31, 1994

[54] DYNAMICALLY ADAPTING MULTIPLE VERSIONS ON SYSTEM COMMANDS TO A SINGLE OPERATING SYSTEM

[75] Inventor: Wayne O. Evans, Rochester, Minn.

[73] Assignee: International Business Machines Corporation, Armonk, N.Y.

[ * ] Notice: The portion of the term of this patent subsequent to Jan. 12, 2010 has been disclaimed.

[21] Appl. No.: 941,999

[22] Filed: Sep. 8, 1992

Related U.S. Application Data

[63] Continuation of Ser. No. 515,772, Apr. 23, 1990, Pat. No. 5,179,703, which is a continuation of Ser. No. 121,965, Nov. 17, 1987, abandoned.

[51] Int. Cl.$^5$ .............................................. G06F 15/38
[52] U.S. Cl. ..................... 395/500; 395/375; 395/700; 364/280.4; 364/286; 364/DIG. 1
[58] Field of Search ................ 395/375, 650, 500, 700

[56] References Cited

U.S. PATENT DOCUMENTS

| | | |
|---|---|---|
| 3,721,961 | 3/1973 | Edstrom et al. . |
| 3,930,232 | 12/1975 | Wallach et al. . |
| 4,031,517 | 6/1977 | Hirtle . |
| 4,199,811 | 4/1980 | Borgerson et al. . |
| 4,459,666 | 7/1984 | Kruger . |
| 4,514,803 | 4/1985 | Agnew et al. . |
| 4,539,638 | 9/1985 | Gaffney . |
| 4,597,044 | 6/1986 | Circello . |
| 4,649,479 | 3/1987 | Advani et al. . |
| 4,654,779 | 3/1987 | Kato et al. . |
| 4,667,290 | 5/1987 | Goss et al. . |
| 4,691,278 | 9/1987 | Iwata . |
| 4,712,189 | 12/1987 | Mohri . |
| 4,718,005 | 1/1988 | Feigenbaum . |
| 4,722,047 | 1/1988 | Chan et al. . |
| 4,736,320 | 4/1988 | Bristol . |
| 4,750,110 | 6/1988 | Mothersole et al. . |
| 4,755,932 | 7/1988 | Dietrich . |
| 4,782,442 | 11/1988 | Kojima et al. . |
| 4,787,028 | 11/1988 | Finfrock et al. . |
| 4,788,657 | 11/1988 | Douglas et al. . |
| 4,899,306 | 2/1990 | Greer . |
| 4,905,138 | 2/1990 | Bourne .................................. 395/650 |
| 5,121,497 | 6/1992 | Kerr et al. ............................ 395/650 |

FOREIGN PATENT DOCUMENTS

| | | |
|---|---|---|
| 0169565 | 1/1986 | European Pat. Off. . |
| 2016755 | 9/1979 | United Kingdom . |

OTHER PUBLICATIONS

IBM Technical Disclosure Bulletin, vol. 15, No. 3, Aug. 1972 entitled "Instruction Translator" by J. C. Kemp.
IBM Technical Disclosure Bulletin, vol. 28, No. 1, Jun. 1985 entitled "Fully Microcode-Controlled Emulation Architecture" by E. S. Hannon.

*Primary Examiner*—Robert B. Harrell
*Assistant Examiner*—William M. Treat
*Attorney, Agent, or Firm*—Roy W. Truelson; Homer L. Knearl

[57] ABSTRACT

Multiple versions of a given system command are run on a single operating system by using one command processing program per command irrespective of its version. Each version of the command has a command definition which has the same format for all counterparts of the command. A command analyzer program transforms the parameters of a command character string into the correct data form for its command processing program based on the command definition for that version of the command. Multiple sets of command definitions are placed in separate storage directories called libraries. The libraries are searched based on a version identifier to find the command definition for a command. The version identifier may be specified as a program attribute, entered interactively or entered by the system. Multiple programs written with different versions of commands may be run in conjunction with each other and the system will dynamically adapt to the version of each program as it is running. Also more than one command definition library may be searched to process a command. Therefore, commands written in various versions may be embedded in the same program and the system will dynamically adapt to multiple versions of commands in a program.

13 Claims, 15 Drawing Sheets

COMMAND DEFINITION

```
NAME OF COMMAND
PROCESSING PROGRAM
KEYWORD:    _____
LENGTH:     _____
DATA TYPE:  _____        PARM 1
DEFAULT:    XXXX
MAPPING LOGIC: _____
               _____

KEYWORD:    _____
LENGTH:     _____
DATA TYPE:  _____        PARM 2
CONSTANT:   XXXX
MAPPING LOGIC: _____
               _____

. . .

KEYWORD:    _____
LENGTH:     _____
DATA TYPE:  _____        PARM "X"
MAPPING LOGIC: _____

LAST PARAMETER TAG
```

FIG. 1B

COMMAND CHARACTER STRING

NAME  KEYWORD(VALUE),  KEYWORD(VALUE), .... KEYWORD(VALUE),
      └─── PARM 1 ───┘ └── PARM "X" ──┘     └── PARM 2 ──┘

FIG. 1C

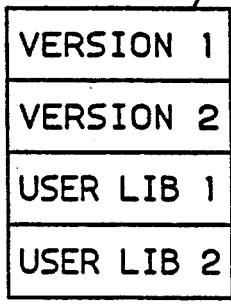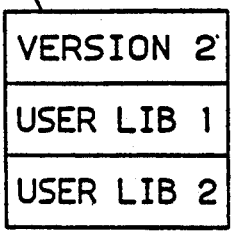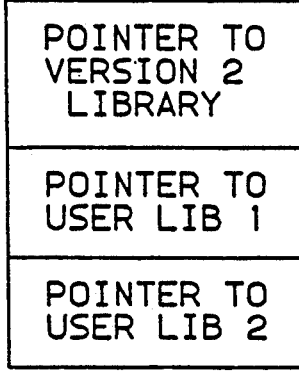
FIG. 6

```
┌─────────────────────┐        ┌─────────────────────┐
│ NAME OF CPP-        │        │ NAME OF CPP-        │
│         QCNLWTR     │        │         QCNLWTR     │
├─────────────────────┤        ├─────────────────────┤
│ KEYWORD - WTR       │        │ KEYWORD - WTR       │
│ LENGTH - 10         │        │ LENGTH - 10         │
│ DATA TYPE - *NAME   │        │ DATA TYPE - *NAME   │
│ MAPPING LOGIC       │        │ MAPPING LOGIC       │
│                     │        │    *ALL      1      │
│                     │        │    *SYSVAL   2      │
├─────────────────────┤        ├─────────────────────┤
│ KEYWORD - OPTION    │        │ KEYWORD - OPTION    │
│ LENGTH - 1          │        │ LENGTH - 1          │
│ DATA TYPE - CHAR    │        │ DATA TYPE - CHAR    │
│ MAPPING LOGIC       │        │ MAPPING LOGIC       │
│    *CNTRLD    1     │        │    *CNTRLD    1     │
│    *IMMED     2     │        │    *IMMED     2     │
│    *PAGE END  3     │        │    *PAGE END  3     │
└─────────────────────┘        └─────────────────────┘
```

CNLWTR
VERSION 1

ENDWRT
VERSION 2

CNLWTR (CANCEL WRITER) COMMAND

THE CANCEL WRITER (CNLWTR) COMMAND TERMINATES THE SPECIFIED SPOOLING WRITER AND MAKES ITS ASSOCIATED OUTPUT DEVICE AVAILABLE TO THE SYSTEM.

VERSION 1

ENDWTR (END WRITER) COMMAND

THE END WRITER (ENDWTR) COMMAND ENDS THE SPECIFIED SPOOLING WRITER AND MAKES ITS ASSOCIATED OUTPUT DEVICE AVAILABLE TO THE SYSTEM.

VERSION 2

```
┌─────────────────────────┐      ┌─────────────────────────┐
│ NAME OF CPP             │      │ NAME OF CPP             │
│     QCRTJOBQ            │      │     QCRTJOBQ            │
├─────────────────────────┤      ├─────────────────────────┤
│ KEYWORD - JOBQ          │      │ KEYWORD - JOBQ          │
│ LENGTH  - 20            │      │ LENGTH  - 20            │
│ DATA TYPE - *NAME       │      │ DATA TYPE - *NAME       │
│ DEFAULT - QGPL          │      │ DEFAULT - *CURLIB       │
│ MAPPING LOGIC           │      │ MAPPING LOGIC           │
│                         │      │    *CURLIB ⟶ 1          │
├─────────────────────────┤      ├─────────────────────────┤
│ KEYWORD - OPRCTL        │      │ KEYWORD - OPRCTL        │
│ LENGTH  - 1             │      │ LENGTH  - 1             │
│ DATA TYPE - *CHAR       │      │ DATA TYPE - *CHAR       │
│ DEFAULT - *YES          │      │ DEFAULT - *YES          │
│ MAPPING LOGIC           │      │ MAPPING LOGIC           │
│    *NO  - 0             │      │    *NO  - 0             │
│    *YES - 1             │      │    *YES - 1             │
├─────────────────────────┤      ├─────────────────────────┤
│ KEYWORD - PUBAUT        │      │ KEYWORD - AUT           │
│ LENGTH  - 1             │      │ LENGTH  - 1             │
│ DATA TYPE - CHAR        │      │ DATA TYPE - CHAR        │
│ DEFAULT - *NORMAL       │      │ DEFAULT - *USE          │
│ MAPPING LOGIC           │      │ MAPPING LOGIC           │
│    *NORMAL - 1          │      │    *CHANGE -  1         │
│    *ALL    - 2          │      │    *ALL    -  2         │
│    *NONE   - 0          │      │    *EXCLUDE - 0         │
│                         │      │    *USE    -  3         │
├─────────────────────────┤      ├─────────────────────────┤
│ KEYWORD - TEXT          │      │ KEYWORD - TEXT          │
│ LENGTH  - 50            │      │ LENGTH  - 50            │
│ TYPE    - CHAR          │      │ TYPE    - CHAR          │
│ DEFAULT - *BLANK        │      │ DEFAULT - *BLANK        │
│ MAPPING LOGIC           │      │ MAPPING LOGIC           │
│    *BLANK ⟶ X'00'       │      │    *BLANK ⟶ X'00'       │
└─────────────────────────┘      └─────────────────────────┘

CRTJOBQ                          CRTJOBQ
        VERSION 1                        VERSION 2

FIG. 8A                          FIG. 8B
```

CRTJOBQ (CREATE JOB QUEUE) COMMAND

THE CREATE JOB QUEUE (CRTJOBQ) COMMAND CREATES A NEW JOB QUEUE.

VERSION 1

CRTJOBQ (CREATE JOB QUEUE) COMMAND

THE CREATE JOB QUEUE (CRTJOBQ) COMMAND CREATES A NEW JOB QUEUE.

VERSION 2

```
┌─────────────────────────┐        ┌─────────────────────────┐
│ NAME OF CPP             │        │ NAME OF CPP             │
│     QCLRDKT             │        │     QCLRDKT             │
├─────────────────────────┤        ├─────────────────────────┤
│ KEYWORD -               │        │ KEYWORD - DEV           │
│ LENGTH - 10             │        │ LENGTH - 10             │
│ DATA TYPE - NAME        │        │ DATA TYPE - NAME        │
│ CONSTANT - QDKT         │        │                         │
├─────────────────────────┤        ├─────────────────────────┤
│ KEYWORD - LOC           │        │ KEYWORD -               │
│ LENGTH - 30             │        │ LENGTH - 30             │
│ DATA TYPE - CHAR        │        │ DATA TYPE - CHAR        │
│ DEFAULT - *M12          │        │ CONSTANT- *S1           │
│          *FIRST         │        │          *FIRST         │
│          *LAST          │        │          *LAST          │
├─────────────────────────┤        ├─────────────────────────┤
│ KEYWORD - VOL           │        │ KEYWORD - VOL           │
│ LENGTH - 18             │        │ LENGTH - 18             │
│ DATA TYPE - NAME        │        │ DATA TYPE - NAME        │
│ DEFAULT *LOC            │        │ DEFAULT *MOUNTED        │
│ MAPPING LOGIC           │        │ MAPPING LOGIC           │
│    *LOC - 1             │        │    *MOUNTED -> 2        │
├─────────────────────────┤        ├─────────────────────────┤
│ KEYWORD - CHECK         │        │ KEYWORD - CHECK         │
│ LENGTH - 1              │        │ LENGTH - 1              │
│ DATA TYPE - CHAR        │        │ DATA TYPE - CHAR        │
│ DEFAULT - *YES          │        │ DEFAULT - *YES          │
│ MAPPING LOGIC           │        │ MAPPING LOGIC           │
│    *NO  -> N            │        │    *NO  -> N            │
│    *YES -> Y            │        │    *YES -> Y            │
├─────────────────────────┤        ├─────────────────────────┤
│ KEYWORD - SUFFIX        │        │ KEYWORD -               │
│ LENGTH - 1              │        │ LENGTH - 1              │
│ DATA TYPE - CHAR        │        │ DATA TYPE - CHAR        │
│ DEFAULT  *NO            │        │ CONSTANT- *NO           │
│ MAPPING LOGIC           │        │ MAPPING LOGIC           │
│    *NO  -> N            │        │    *NO  -> N            │
│    *YES -> Y            │        │    *YES -> Y            │
└─────────────────────────┘        └─────────────────────────┘

CLRDKT                              CLRDKT
       VERSION 1                           VERSION 2

FIG. 9A                             FIG. 9B
```

CLRDKT (CLEAR DISKETTE) COMMAND

THE CLEAR DISKETTE (CLRDKT) COMMAND DELETES ALL FILES, ACTIVE AND INACTIVE, FROM ONE OR MORE DISKETTES BY DELETING THE DATA FILE IDENTIFIERS FROM THE DISKETTE LABEL AREA ON EACH DISKETTE.

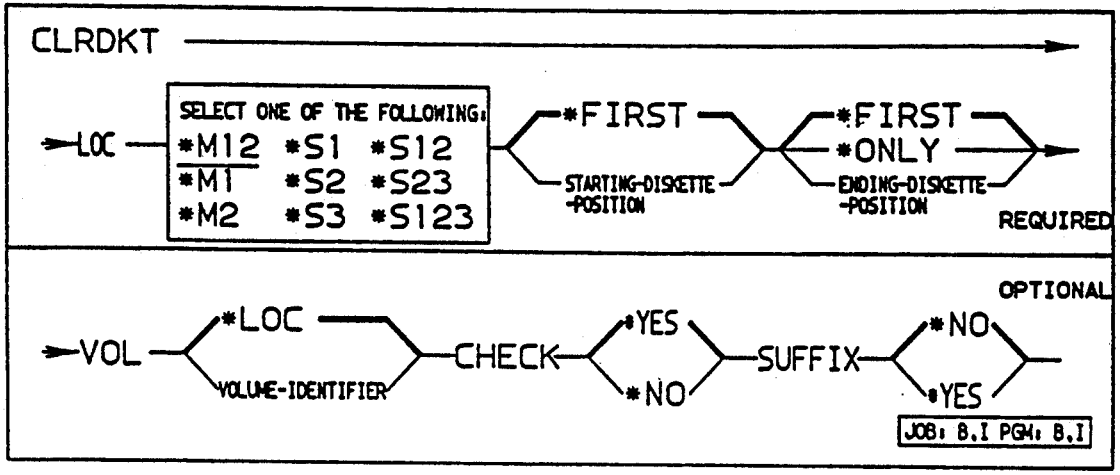

VERSION 1

FIG. 9C

CLRDKT (CLEAR DISKETTE) COMMAND

THE CLEAR DISKETTE (CLRDKT) COMMAND DELETES ALL FILES, ACTIVE AND INACTIVE, FROM A DISKETTE BY ERASING THE DATA FILE IDENTIFIERS FROM THE DISKETTE LABEL AREA.

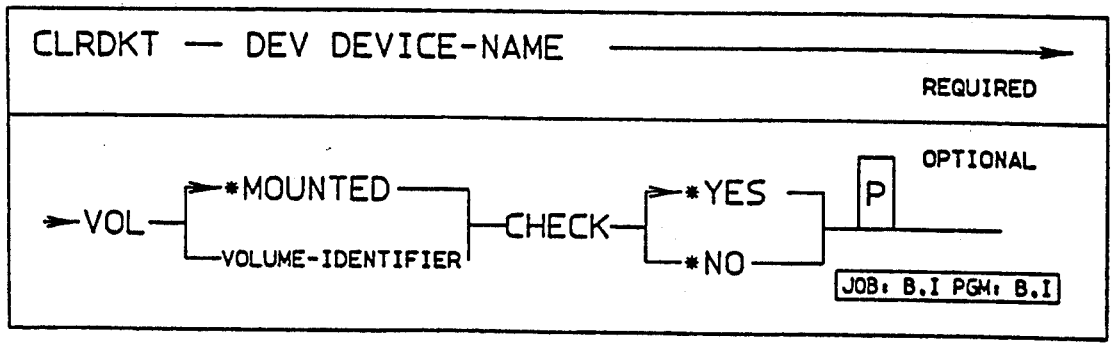

VERSION 2

FIG. 9D

DYNAMICALLY ADAPTING MULTIPLE VERSIONS ON SYSTEM COMMANDS TO A SINGLE OPERATING SYSTEM

RELATED APPLICATIONS

This is a continuation application of U.S. patent application Ser. No. 07/515,772, filed Apr. 23, 1990, now U.S. Pat. No. 5,179,703, which is a file wrapper continuation of U.S. patent application Ser. No. 07/121,965, filed Nov. 17, 1987, now abandoned.

BACKGROUND OF THE INVENTION

The present invention relates to operating system commands, and in particular to adapting to multiple versions of operating system commands.

When a decision is made by a computer manufacturer to switch to a new operating system to take advantage of better hardware, better usability, new standards, etc., it is crucial that customers using the old operating system be able to run their application programs on the new operating system. This protects the customer's investment in their application software.

One way to solve this software compatibility problem is to use conversion programs, which take the source code of the customer application program, and convert it to run with the new operating system commands. A limitation of this method is that the source language statements have been lost, or do not exist for some applications. In addition, the conversion of source is often a lengthy process that slows the implementation of existing applications on a new system.

A further solution has been the implementation of multiple system environments by the computer maker. Existing interfaces (system commands available to a user) are maintained by keeping both the previous and new versions of operating system programs that perform a similar function. This method requires a user to select the environment that an application will use, as well as requiring the maintenance and storage of two or more sets of operating system programs. The user also can not integrate new function provided by the new operating system program into an existing application program without converting the entire application program to use the new operating system.

One example of the multiple system environment solution is found in U.S. Pat. No 4,691,278 to Iwata, in which multiple system architectural modes are provided. A register contains a mode selector value. One instruction of a program will invoke a series of microinstructions which may be different for different modes. The starting address of microinstructions may vary for the same instruction depending on the mode selected for the program. Different sets of microinstructions must be maintained in this method.

SUMMARY OF THE INVENTION

A computer system is designed to dynamically adapt multiple versions of operating system commands to a single operating system. The single operating system is made up of multiple, command-processing programs for executing commands having a universal format. The operating system version desired by a user is identified either in an interactive session, or by an attribute in a program that the user desires to run.

Multiple versions of a given system command can be executed on the single operating system by having a command definition for each version of a command, which definition has universal parameters for all versions of the command. Each version of the command can then be transformed by the command definition for that version into a format acceptable to the universal, command processing program.

Multiple sets of command definitions are placed in separate storage directories called libraries. The libraries are then searched for each command definition when the corresponding command is to be processed. The order of search of the libraries is controlled based on the version of system commands desired.

A command definition consists of the name of the command processing program, and the parameter definitions that go with that program. The different versions of commands vary in the number of parameters, and hence, in the extent of function provided. Each version of a command is transformed by using its command definition. The command definition insures that the same number of parameters are passed to the command processing program. This is done by using constants for parameter values which are missing in different versions. Thus, only one operating system using its universal command processing programs runs the different versions of the same system command.

A user application generally consists of multiple application programs. Since each application program contains an attribute which defines the version of system commands desired, the application can contain a mix of application programs that use different versions of the operating system commands. If a user is gradually migrating to an enhanced version of the operating system, new programs for the existing application can be written using the new application version of system commands. The existing application programs in the application can be either rewritten one at a time to take advantage of the advanced functions, or left as is, using the older version of system commands.

A newer version of system commands which has enhanced function usually has a number of additional new commands. The new commands can be used in an application program which specifies the older version of system commands. This is because the library containing the older version of system command definitions will be searched first, and if the command is not found, the newer version of command definitions will be searched for the command. The first command definition matching the desired command is then processed. Therefore, a user need not convert an entire older application program to add the new function to it.

DESCRIPTION OF THE DRAWINGS

FIG. 1 is the format of a command definition stored in the libraries of FIG. 1A.

FIG. 1C is the format of a command character string.

FIG. 6 is a block diagram showing the search order through the version libraries of system commands depending on the version attribute of the program being processed.

FIG. 7A-D, 8A-D and 9A-D are examples of counterpart commands, their different versions of command definitions, and their different syntax.

DESCRIPTION OF PREFERRED EMBODIMENT

As originally written, each application program would expect to use a particular version of system commands written for the program's original operating system. If one were to compare system commands from various operating systems, many system commands for one operating system will be similar to their counterpart commands in the other operating systems. These counterpart system commands may use the same or different command name and may use different parameters or a different number of parameters per command.

An example of a complete command set for an operating system can be seen in a manual for an IBM System/38 entitled IBM System/38 Control Language Reference Manual (SC21-7731) 1986. This command set is referred to hereinafter as the version 1 (V1) command set. A second command set including almost all of the approximately 500 version 1 commands, plus about 200 new commands is the version 2 (V2) command set. The version 2 commands which are similar to the version 1 commands may have the same name, or a different name. They may have more parameters, the same number of parameters, or fewer parameters.

Figure 1A:
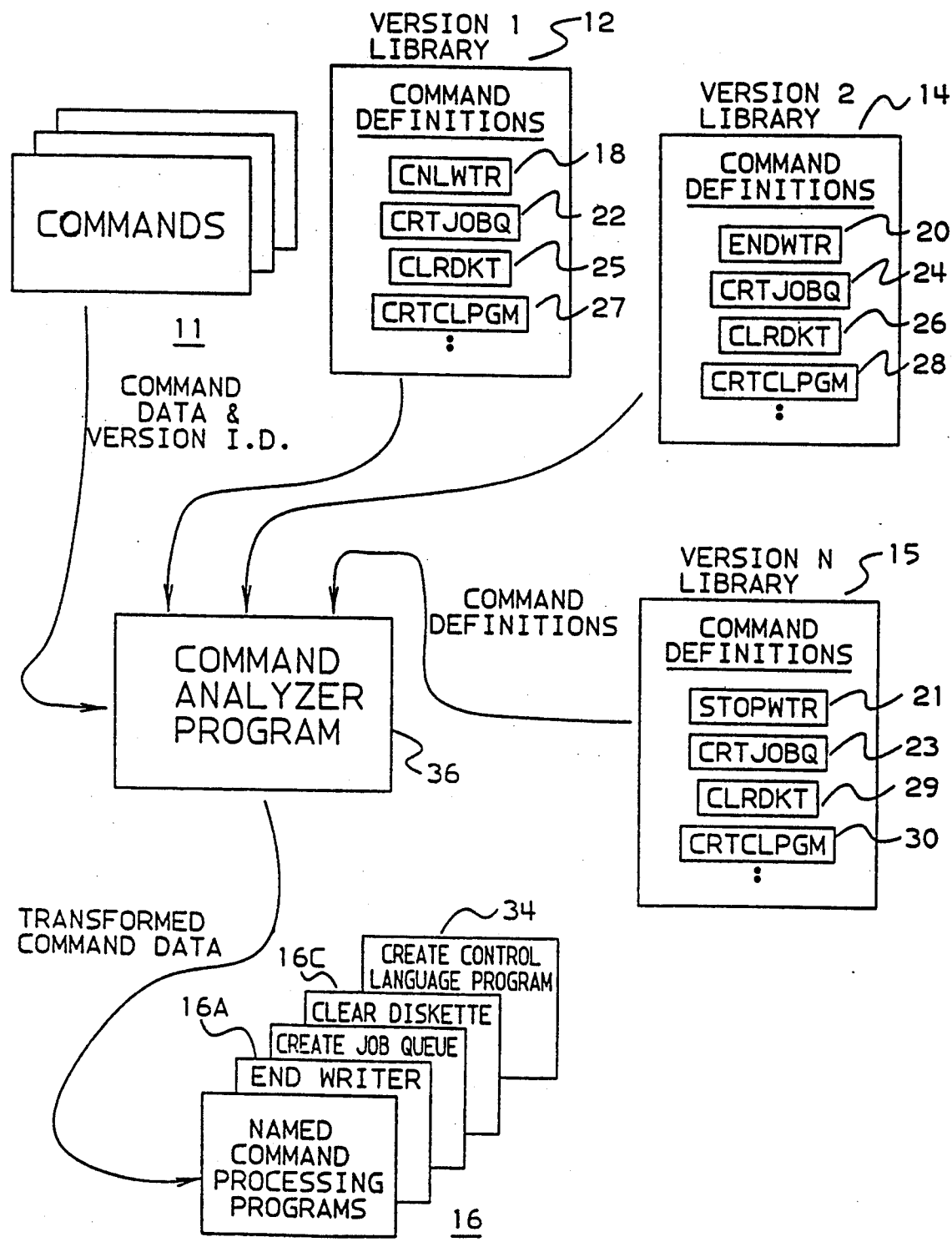
FIG. 1A is pictorial representation of how the invention adapts commands from various versions of an operating system to run in a single operating system.

FIG. 1A pictorially represents the use of command processing programs 16 to perform the task or tasks called for by system commands 11 irrespective of which set or version the command comes from. There is one command processing program 16 for each command 11. A command written for version 1, 2 or N can be processed by the same command processing program. (In a few cases, the function difference between counterpart commands is so different that each counterpart command has its own command processing program.) This is accomplished by transforming the command data to transformed data so that all counterpart commands in different versions have the same name and the same number of parameters.

Command analyzer program 36 performs the transformation based on a command definition for each counterpart version of a command. The counterpart command definitions have the same number of parameters and the same positional or sequential relationship between parameters from version to version. This universal format for counterpart command definitions is used to transform the actual command character string into a form compatible with the command's universal command processing program 16.

In FIG. 1A separate versions of system command definitions are stored in libraries 12, 14 and 15. A first version in library 12 is a set of definitions for system commands from a version of an operating system for the IBM System/38. The second version in library 14 is a set of command definitions of system commands for an enhanced version of the System/38 operating system. An "Nth" version in library 15 is a set of command definitions for system commands of a customized system or a future operating system and indicates that any number of versions may be used.

In FIG. 1A names of counterpart command definitions are shown in each version library. The Cancel Writer command definition 18 in library 12 uses the name CNLWTR. The same function is achieved by its counterpart command ENDWTR whose command definition 20 is stored in version 2 library 14 and counterpart command STOPWTR whose definition 21 is stored in version N library 15. The command name in this example changes from version to version, but due to the counterpart command definitions all of these commands will call the universal command processing program 16A named End Writer.

Create Job Queue uses the same name, CRTJOBQ, for each of its counterpart definitions 22, 23 and 24 in libraries 12, 15 and 14 respectively. For CRTJOBQ, the number of parameters in each definition is the same although the keywords in the parameters are different. Clear Diskette command uses the same name, CLRDKT, for each of its counterpart definitions 25, 26 and 29 in the libraries, but each version of the command has a different number of parameters. These counterpart commands use different syntax and have different definitions in version 1 and version 2. They are shown in FIGS. 7-9 or are described in more detail hereinafter.

Create Control Language Program command uses the same name, CRTCLPGM, for each version and has different numbers of parameters in each of its counterpart definitions 27, 28 and 30 in the libraries. The command processing program for this command is compiler 34 whose function and operation will be described in detail in FIG. 5.

The actual format of command definitions and commands is shown in FIG. 1B and 1C respectively. In FIG. 1C, each command begins with the command name such as ENDWTR or CRTJOBQ. This is followed by a keyword and value for each parameter in the command. The entry sequence of the parameters is not important in the command, and the parameters in FIG. 1C are not arranged in the same order as those in the command definition in FIG. 1B. In FIG. 1C, the command definition format consists of the name of the command processing program to be called for execution and the parameter definitions for the command. The parameter definitions are used by the command analyzer 36 (FIG. 2) to interpret a received command character string containing the command and command parameters. The analyzer checks the syntax of the command string, rearranges the sequence of parameters, and builds a pointer table to point to the parameter information to be used by the called command processing program. This process will be described in more detail hereinafter with reference to FIG. 2A.

The parameter definition elements stored for each parameter in each command definition in a version library are keyword, length, data type, default or constant, and mapping logic. The keyword identifies the parameter. The length specifies the legitimate length of the parameter. A parameter that exceeds its length boundaries will cause the command to be rejected. The data type specifies rules for the data which vary depending on whether the data type is name, decimal, binary, etc. Default specifies actual parameter values that will be inserted if the keyword for that parameter is missing from the command. A constant specifies a value that is inserted for a parameter by the system; a constant can not be inserted by the user. Mapping logic refers to a logical conversion of the parameter from a name to a value representing the name.

FIGS. 2A, 2B, 3A, 3B and 4 show a preferred embodiment of the invention which will run various versions of a command entered interactively or as a part of a selected program. A command is entered interactively at a terminal by a user typing the character string for the command and its parameters. One user, represented as interactive sesson 70, can be using version 1 commands in an interactive session, while at the same time and on the same system, a second user, represented as interactive session 72, can be issuing version 2 commands. The first user is issuing version 1 commands in a session controlled by a command entry screen program 74 named QCL. This program can be called by the user or preset by the system programmer at system definition, or pre-specified by the user so that it is called each time the user signs on through a workstation.

Figure 2A:
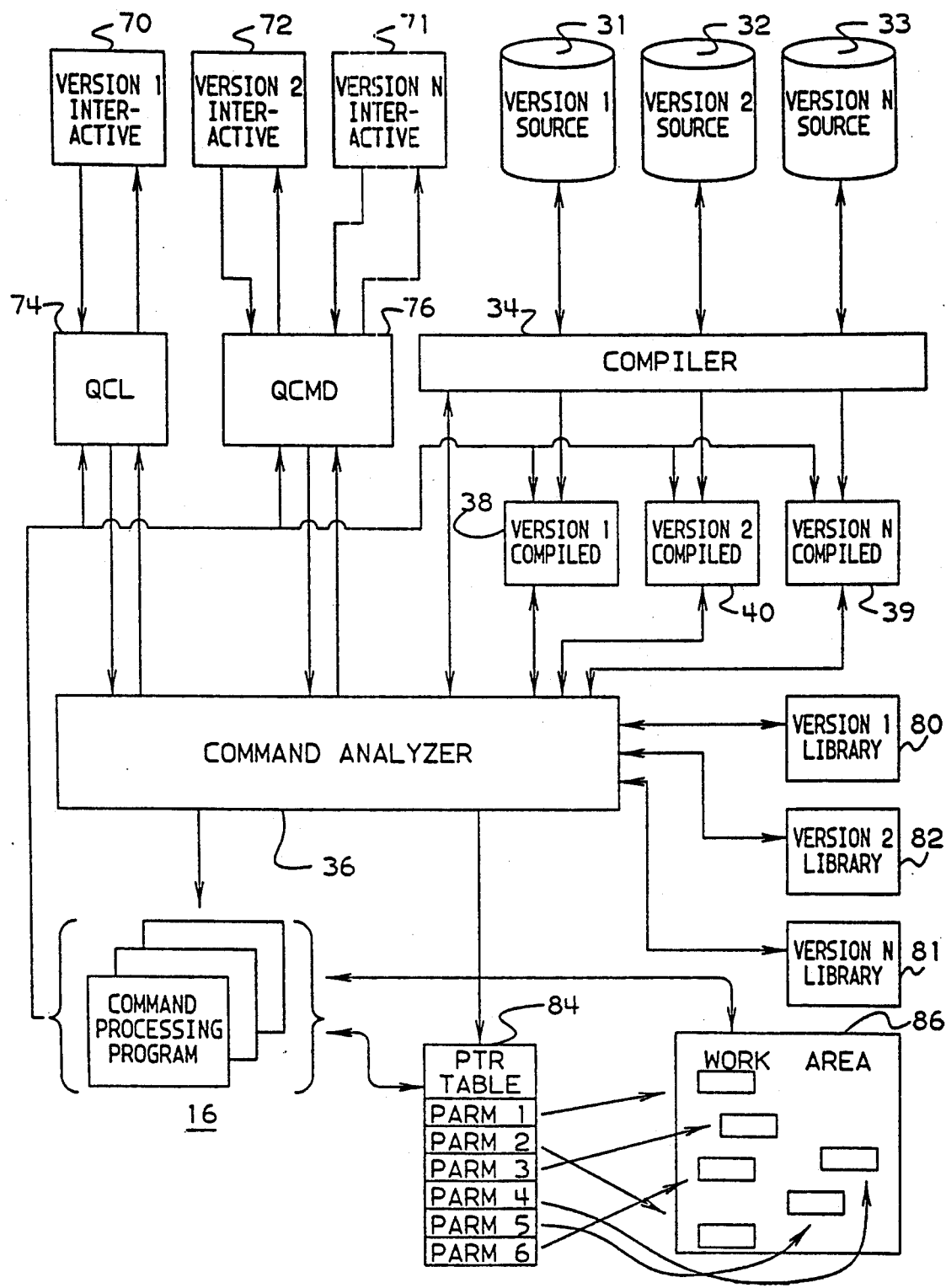
FIG. 2A is a data flow diagram of the preferred embodiment of the invention.
Figure 2B:
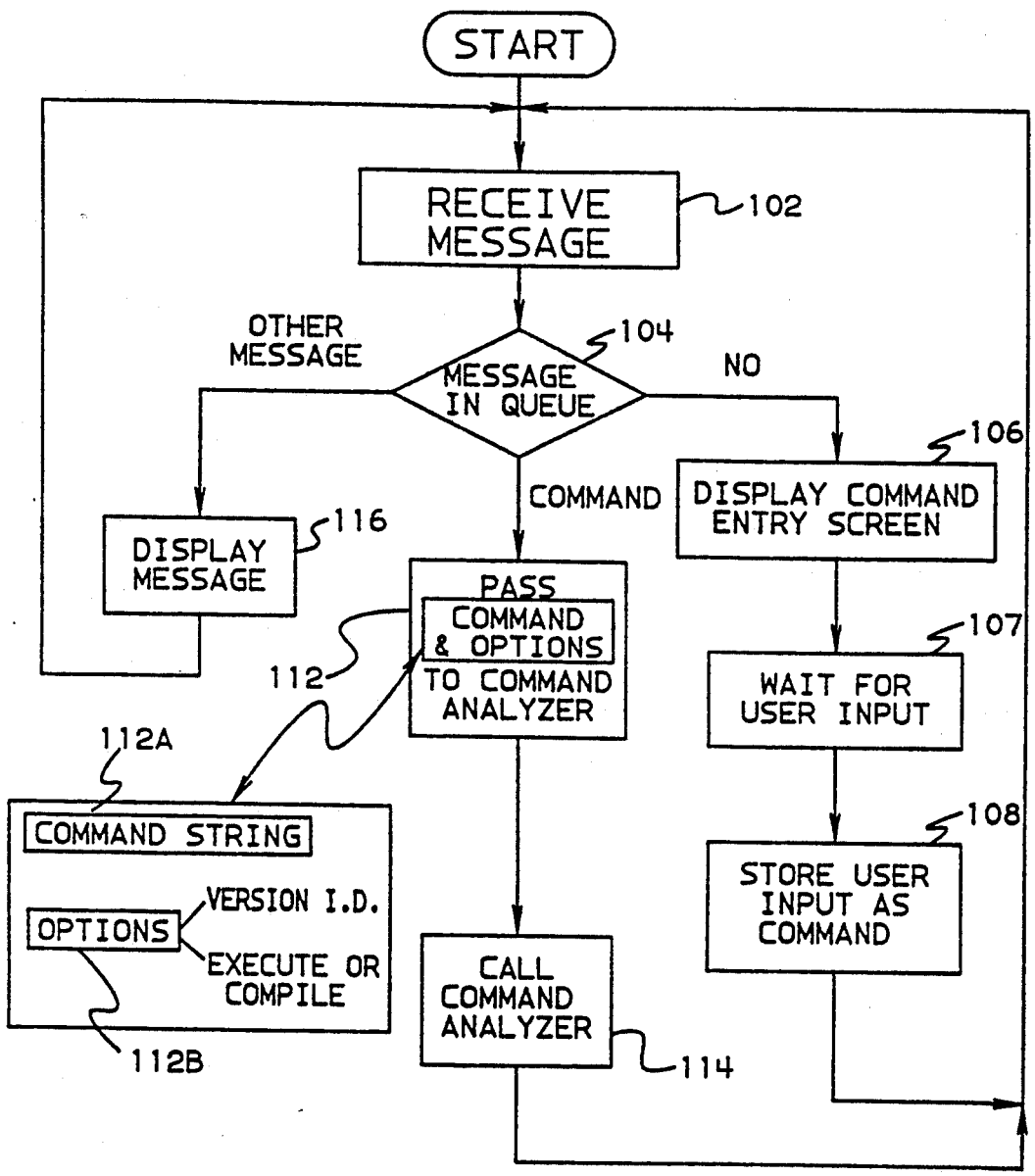
FIG. 2B is a flow chart of the QCL/QCMD programs shown in FIG. 2A.

The QCL (or QCMD) program's function is to interface between the workstation display and the command analyzer program 36. QCL/QCMD programs are illustrated in FIG. 2B. When the operating system gives QCL control, QCL issues a receive message signal at step 102 which causes a message queue to pass the top message in its queue to QCL. Decision 104 branches the program flow depending on whether there is no message in the queue, the message is a command or the message is other than a command (error or diagnostic message for example).

If there is no message, step 106 causes a command entry screen to be displayed at the workstation. QCL then waits 107 for the user to enter a command. After the user responds with a command, QCL stores (108) the command in the message queue. The QCL program returns to receive message 102 and checks for messages in the queue at decision step 104. Since there is now a command in the queue, QCL branches to step 112. Step 112 passes the command character string and option information to the command analyzer 36 (FIG. 2A). The option information includes the version ID and an indicator that the command is to be executed. After the command and options are passed, QCL calls (114) the command analyzer program and then returns to receive message.

As part of this invention, if the message is a command, step 112 calls the command analyzer and step 114 passes to the command analyzer the command 112A and option 112B containing the version ID. If the program running is QCL, the version ID passed is Version 1. If the program running is QCMD, the version ID passed is Version 2. It will be apparent to one skilled in the art that rather than using different programs to pass version ID's, a single program might be used whose profile could be changed by the user or a system engineer to specify the desired version ID.

The last branch from decision 104 is "other message." If there is a message but it is not a command, steps 108 and 110 cause the workstation to display (116) the message. Again QCL program control returns to receive message step 102.

Regardless of which interactive session 70, 71 or 72 in FIG. 2A is run, the commands along with a V1, V2 or V"N" version indication are sent to the command analyzer 36, which then checks the commands for syntax and semantics in accordance with the command definition from the appropriate version library. As explained above, the version identification V1, V2 or V"N" is passed to the command analyzer and the analyzer is called by either QCL 74 or QCMD 76. Command analyzer 36 searches the appropriate library or libraries 80, 81 or 82 for the command definition.

Command analyzer 36 uses the parameter definitions from the stored command in the appropriate library and the actual parameters in the command character string passed by QCL or QCMD. The analyzer checks the command string for correct semantics and syntax with the parameter definitions. If the string contains an error, an error message is returned to the QCL 74 or QCMD 76 for display at the users workstation. If the string is correct, the command analyzer builds a pointer table 84 which will be used by the command processing program to execute the command.

Pointer table 84 is built according to the predefined sequence of parameters, PARM 1 through PARM X, in the command definition for the command being analyzed. Each entry in the table will point to the storage location in memory work area 86 where the parameter information, received with the command character string or added by the command analyzer, is stored. Pointers to constant or default parameters are added to table 84 and parameter data is added to work area 86 in accordance with parameter definition from the library so that the command from the selected version is compatible with the command processing program.

After command analyzer 36 has built the pointer table, program control passes to the selected command processing program 16. When control is transferred, command analyzer program is dropped from an invocation stack of programs so all messages from the command processing program to to QCL or QCMD. The command processing program (CPP) retrieves the parameters pointed to by the pointer table 84 and executes the command. Then CPP returns appropriate messages to the QCL for display to the user at the workstation.

Another source of commands to be processed is stored programs. The source code for programs written for various versions of an operating system would be typically stored on disk files. In FIG. 2A, three source code versions of programs are indicated at 31, 32 and 33. They could be the same or different programs. The source statements at 31 are written for version 1, source statements at 32 are written for version 2, and source statements at 33 are written for version N program. Before these source code programs can be run they must be compiled.

To compile a program, the user enters the CRTCLPGM (create control language program) command specifying the parameter that identifies the source program to be compiled. The CRTCLPGM command version is identified by option tag being passed by the QCL or QCMD program through which the user entered the CRTCLPGM. The option tag also indicates the CRTCLPGM command processing program is to be executed.

As with any other command, command analyzer 36 retrieves the command definition for CRTCLPGM from the version ID in the option tag. The analyzer then builds the pointer table 84 and parameter data in work area 86 for the CRTCLPGM. When the pointer table and parameter data are complete, the CRTCLPGM program is called for execution. The parameter data for the CRTCLPGM command specifies a constant that indicates the version of the source statements file being compiled.

The CRTCLPGM command program is different from the other command processing programs 16 in that CRTCLPGM's program is the compiler program 34. Compiler 34 then runs using the pointer table and parameter data built from the parameters and parameter definitions for CRTCLPGM.

Figure 5:
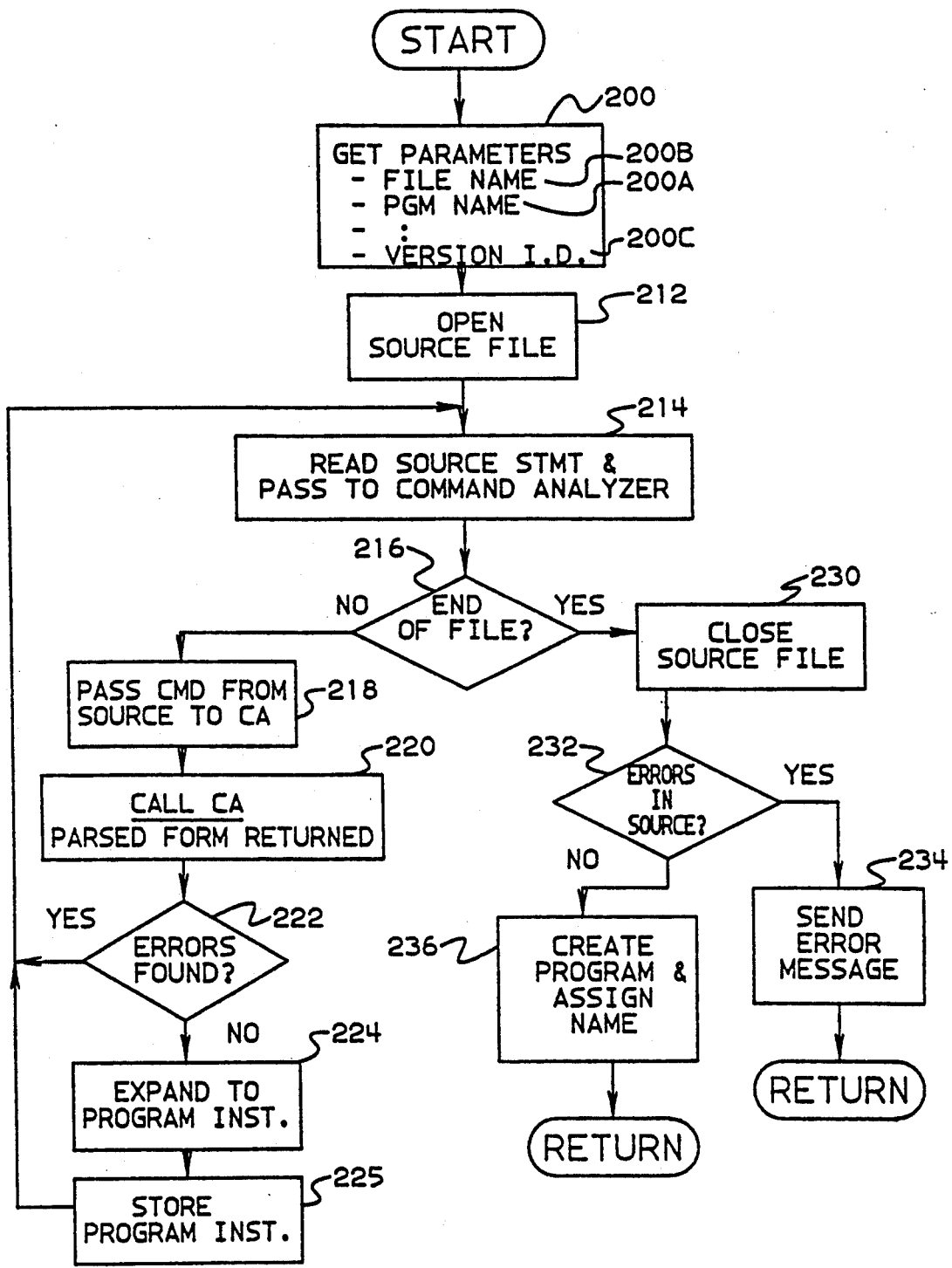
FIG. 5 is a flow chart of the operation of the compiler program 34 in FIG. 2A.

The flow chart for compiler 34 (CRTCLPGM command processing program) is shown in FIG. 5. The compiler at step 200 gets the input parameters from the work area using the pointer table. The parameters include:

Name of Program 200A which is being created (usually same name as the source code file being compiled);

Name of source file 200B whose code is being compiled;

Version number or identifier 200C which indicates the version of commands to be used in compiling the source code for the program being created and compiled.

Compiler 34 opens 212 the source file 31, 32 or 33 identified by the 200B parameter. The compiler reads 214 the source file until a complete command (source statement) can be passed to the command analyzer. Decision 216 tests to see if the end of the source file has been reached. If not, program flow passes to step 218.

At 218 the single command read from the source file is moved into the temporary parameter storage area. The option is set to compile only and the command analyzer is called 220. The command analyzer scans the command character string and creates a parsed and validated form of the command that is returned to the compiler 34. If errors are found in the statement, the occurrence of an error is noted for future reference at steps 232 and 234 and decision 222 returns the flow to step 214 to read the next statement. If no errors were found by the command analyzer decision 222 branches the flow to step 224 where the compiler expands the parsed form of the command into program instructions for the command. The program instructions are then stored 225 at the compiled version 38, 39 or 40 of the program being created. In most cases, program instructions are simply the parsed form of the command.

The compiler continues to read 214 source statements until the end of file is detected for the source file. When end of file is detected 216, then the compiler closes 230 the source file. If decision 232 indicates there are errors in the source, a message is issued by step 234 to the caller, QCL or QCMD, and no program is created.

If no errors were detected during processing of the source, the compiler will create the program at step 236 using input parameter 200A as the name for the compiled program The version ID 200C is also stored in the compiled program so that, when the program is called, it can pass the version ID to the command analyzer. Storing the version ID as a part of the program allows one version program to call another version program. Thus system will dynamically adapt to the version stored in the program.

When a program is selected for execution, the compiled version is run through the command analyzer again. This time, the option information indicates "execute." As each command is processed, the command analyzer 36 transforms the character string data, loads the parameter data in the work area 86, builds the pointer table 84 and calls the named command processing program 16.

Program control passes to the named command processing program 16. The command processing program (CPP) uses the pointer table, retrieves the parameters pointed to, and executes the command. Then CPP returns appropriate messages to the compiled program 38, 39 or 40 that is being run. When the CPP returns control to the compiled program, the next command is sent to the command analyzer for execution. However, if there is an error in execution, the message back to the compiled program may cause the program to send an error message back to QCL or QCMD for display to the user at the workstation.

Figure 3A:
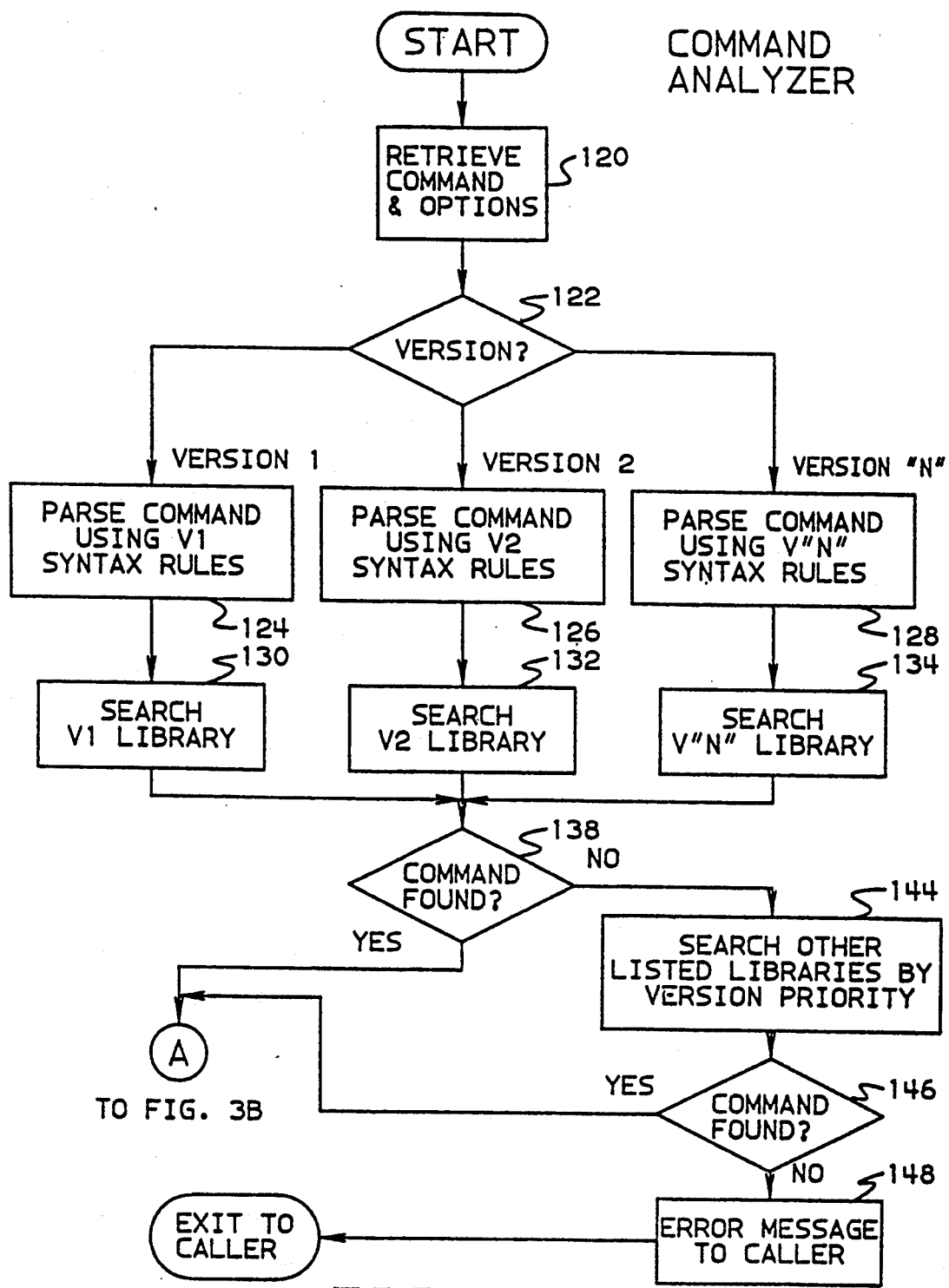
FIG. 3A and 3B is a flow chart of the operation of a command analyzer program 36 in FIG. 2A.
Figure 3B:
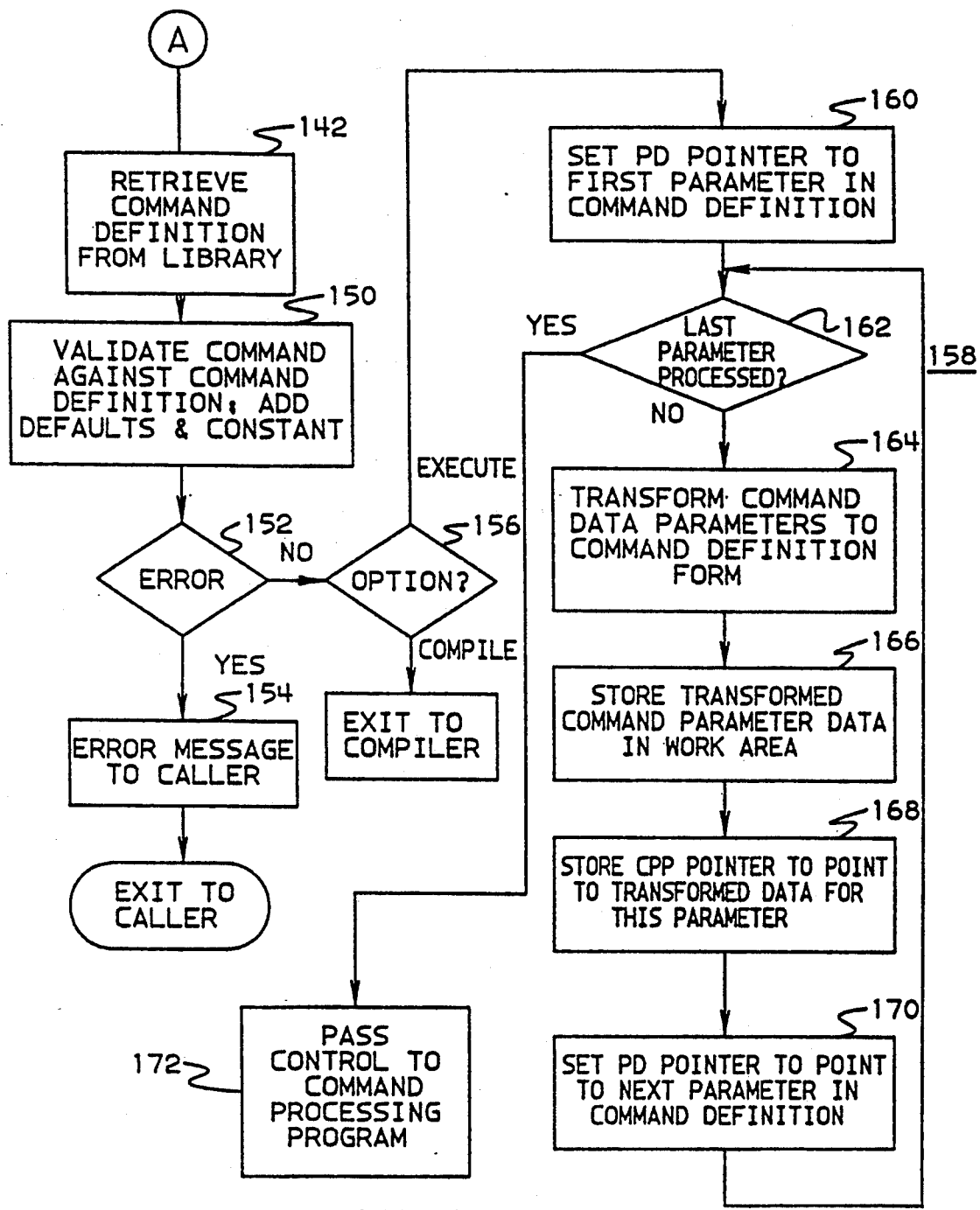

The operation of command analyzer program 36 is shown in more detail in FIG. 3A and 3B. The program starts by retrieving (120) the command character string and the option tags (version ID, compile, execute). Decision 122 branches the program flow according to the version ID to one of the parse routines 124, 126 or 128. The selected parse routine splits the command character string into words and interprets those words according to the syntax rules of the selected version V1, V2 and V"N".

After the command has been parsed into its parameters, the program searches the appropriate version library (step 130, 132 or 134) for the command definition of the command being processed. If the command definition is found in the selected version library, decision 138 would branch program flow to step 142 in FIG. 3B which then retrieves the definition from the library. If the command definition is not found in the selected library, then decision 138 branches the program flow to search routine 144.

Search routine 144 searches for the command definition in various libraries. The libraries are searched sequentially according to their sequence in the library list. The libraries and the list are built by the user. The user may choose to have one list or a plurality of lists with each list having a different sequence of libraries. The list could be selected based on the version ID.

For example, a command indicated as from version 2 by decision 122 but not found in the version 2 library at step 132 could use search routine 144 to search libraries according to the version priority—V1 library, V"N" library, User library 1, User library 2, etc. This priority or sequence of listed libraries could be different for each version and could be selected as a function of version ID in the same way that decision 122 selected the first library to be searched.

Logical search order for version libraries is shown in FIG. 6. When a program has a program attribute indicating that version 1 programs are to be run, the search order of the libraries is as indicated at 60. The version 1 library is first searched. If the command that is searched for is not found in the version 1 library 12, the version 2 library 14 is searched. Then, if still not found, a first user library is searched, then a second. A user library is a library which is specified by the user, and usually contains user application programs, files, commands, and other objects.

If the program attribute indicates that the program is a version 2 program, the library search order for that program is the order of libraries indicated at 62 in FIG. 6. Note that the first version of the command definitions is not searched for a version 2 program. This is because in the particular embodiment, some version 2 commands have the same name as the version 1 commands. In order to ensure that the version 2 command is actually processed, it is necessary to search the version 2 library first.

The search order of libraries is controlled by the first library specified by the version ID and searched at steps 130, 132 and 134 and by subsequent libraries in a library list. The library list 63 in FIG. 6 which is generated for each program. The library list in FIG. 6 is the same type of structure which was used on a System/38. It contains a list of the pointers to libraries to be used by the system when running the program it is associated with. The list is determined by the customer application.

Returning to FIG. 3A, if search routine 144 is successful, decision 146 branches program flow to step 142 in FIG. 3B to retrieve the command definition. If the search routine is not successful, program flow branches to step 148 which sends an error message back to the caller. The caller may be QCL, QCMD or the program being compiled or executed.

FIG. 3B shows how the command analyzer program processes the command character string after the analyzer has found the command definition. After retrieval of the definition at step 142, validation routine 150 checks the command against the definition. Validation consists of verifying each word of parameter data against the definition for that parameter in the command definition. As described earlier with reference to FIG. 1B, each parameter is defined by a keyword, length, data type, default or constant, and mapping logic. Validation also includes a check that all required parameters are specified and that no parameter is specified more than once.

Validation routine 150 checks each parameter in the command character string against the definition for that parameter. Routine 150 successively takes each parameter from the command definition and checks for the corresponding parameter in the command character string by looking for the parameter's keyword. If a keyword has no value entered with it, validation routine will designate the default value for that keyword from the parameter definition. If a keyword is missing from the command, the validation routine will insert from the command definition the default value for the missing parameter. Each parameter is temporarily stored in a sequence corresponding to the sequence of parameters in the command definition.

If there is no error in the parameters of the command, decision 152 causes a branch to decision 156. Decision 156 will branch the program flow one of two ways depending on whether the option information passed with the command indicates the command is to be executed or compiled. If it is being compiled, program control returns to the compiler. If it is being executed, control passes to loop 158 that builds pointer table 84 (FIG. 2A).

Loop 158 transforms the validated command character string, now including defaults and constants, into parameter data for sue by the command processing program. Further the loop builds the pointer table to point to storage location of the data making up each parameter. Before entering the loop, the command analyzer program sets (160) its own pointer to point to the first parameter in the command definition. Decision 162 tests the pointer to see if the pointer indicates that the last parameter in the command has been processed. If not the program control passes to the transformation routine 164.

Transformation routine 164 retrieves the parameter definition pointed to and the corresponding validated value for the parameter as temporarily stored by the validation routine. The transformation routine 164 uses the parameter definition to convert the parameter's value to a form expected by the command processing program as indicated by the command definition. Based on the definition of the parameter, the parameter data may be padded with blanks so it has the correct length, or it may be converted to another form of data based on the mapping logic. Thus, each parameter definition causes transformation routine 164 to generate transformed parameter data for each parameter called for in the command definition.

After the transformed parameter data is generated, it is stored (166) in work area 86 (FIG. 2A) of memory. Thereafter, the command analyzer program generates and stores (168) a command processing program (CPP) pointer in pointer table 84 (FIG. 2A). The parameter is now ready for the command processing program so the next parameter can be processed by loop 158.

To get to the next parameter definition, each parameter definition ends with a pointer to the beginning of the next parameter definition. In loop 158 at step 170, the program gets the next parameter definition (PD) pointer and the program loops back to decision 162. If the PD pointer is zero, decision 162 knows the last parameter definition has been processed and program control is passed (172) from the command analyzer program to the command processing program. If the PD pointer points to the next parameter definition, transform routine 164 again proceeds to convert the parameter from the character string to a form compatible with the command processing program.

Figure 4:
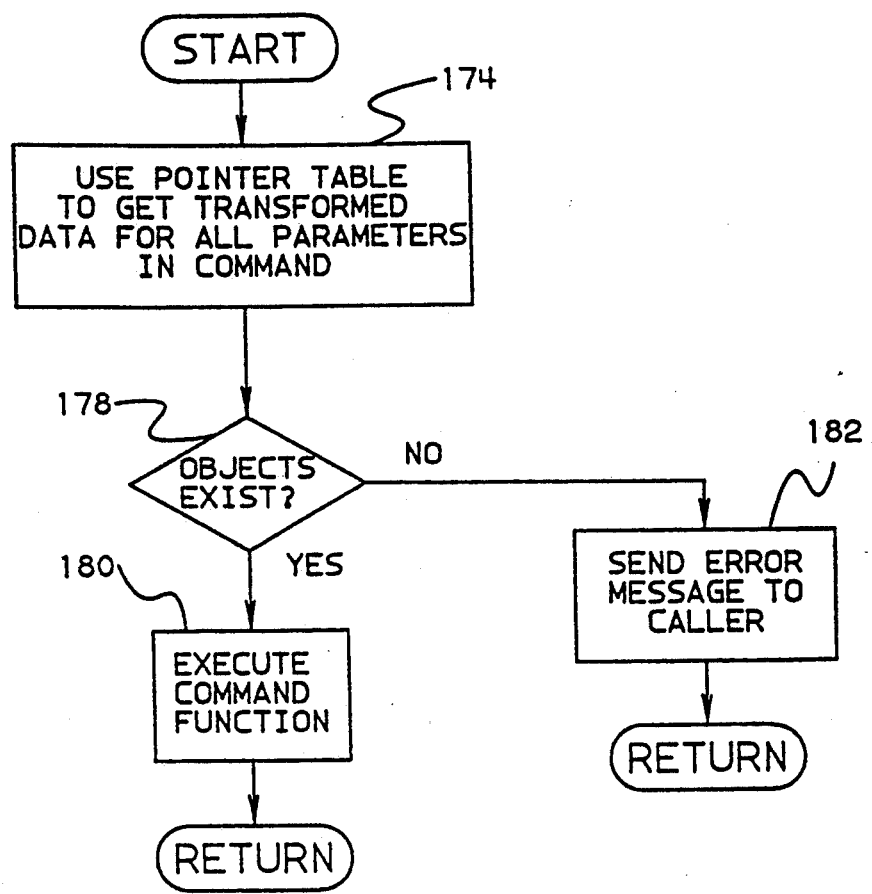
FIG. 4 is a generalized flow chart for the command processing programs 16 in FIG. 2A.

Each command processing program is different depending upon the functions it is intended to execute. Thus a general flow chart of these programs can only be done at a high level as illustrated in FIG. 4. The CPP uses the pointer table to get 176 the transformed data. This is done for all parameters in the command. After all the transformed parameter data has been retrieved, decision 178 determines if all the objects, such as devices, files, commands, programs, etc., exist. If they do, program flow branches to step 180. The command is then executed using all of the parameter data. Thereafter program control returns to the command source, QCL, QCMD or the compiled program being run. If one or more objects does not exist in the system, decision 178 branches the flow to step 182. Step 182 sends an error message back to command execution requester, QCL, QCMD or the compiled program.

Description of Selected Version 1 and Version 2 Commands

Version 1:CNLWTR (Cancel Writer) Command
Version 2:ENDWTR (End Writer) Command

When the version 1 command CNLWTR (Cancel Writer) indicated at 18 (FIG. 1A), is used by a program or interactive user session, its command definition, see FIG. 7A, is accessed from the version 1 library 12, and sent on to the command processing program 16A for processing. The command processing program is independent of the name of the command, so either name, CNLWTR or ENDWTR performs the same functions.

The CNLWTR and ENDWTR command definitions are shown in FIG. 7A and 7B. The purpose of these commands is to end spooling writers and make their associated output devices available to the system. In both versions, a writer can be ended immediately or in a controlled manner by use of the OPTION keyword which has potential values of CNTRLD (controlled), IMMED (immediate) and PAGEEND. If ended immediately, the writer stops writing the file and the file is made available again on the output queue. If ended in a controlled manner, the writer finishes writing the current file (or a copy of a file), or it finishes printing a page of the file, before it is ended. The version 2 command ENDWTR has added function. It can now specify that all writers on the system should be ended, or a tuning parameter can be used to end some of the writers. The version 1 command could only identify the writer-name as a value for the keyword WTR.

Figure 7C:
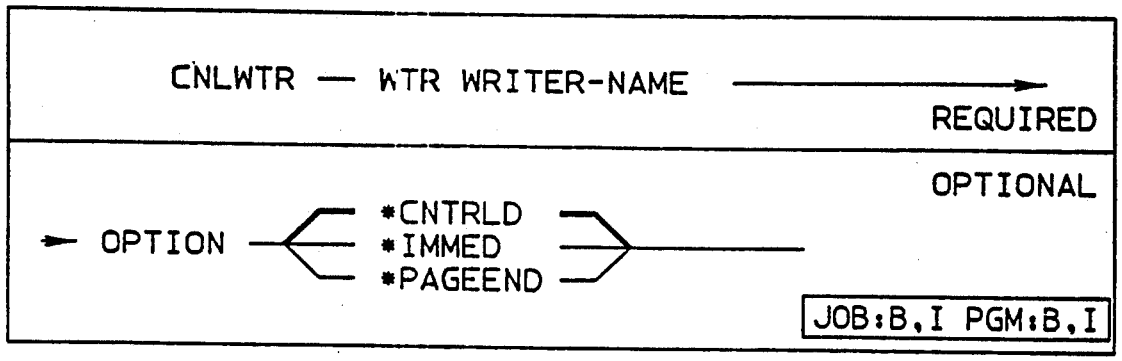

FIG. 7C illustrates the syntax of the Version 1 CNLWTR. WTR is a required parameter and the user must enter a device name after the keyword WTR when using the command. Option is an optional parameter which uses the default value *CNTRLD when the user does not enter the keyword.

Figure 7D:
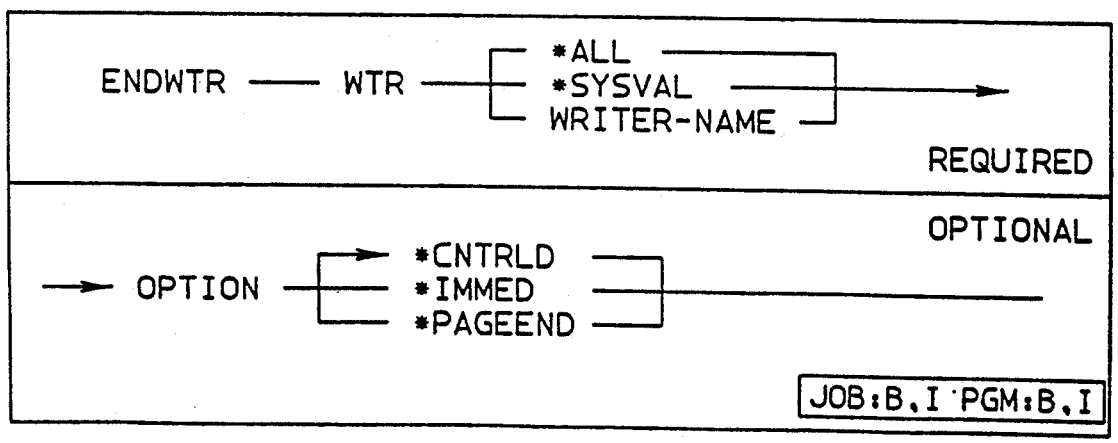

FIG. 7D illustrates the syntax of the Version 2 ENDWTR. In addition to the name change, more values are available for the WTR parameter in Version 2.

Version 1:CRTJOBQ (Create Job Queue) Command
Version 2:CRTJOBQ (Create Job Queue) Command A pair of commands having the name CRTJOBQ (Create Job Queue) are also illustrated in the command definition libraries in FIG. 1A at 22 and 24 in their respective libraries. While the name is the same for both versions, the parameters are quite different as can be seen in FIG. 8A and 8B. A complete description of the version 1 command and its parameters appears in the above referenced System/38 manual.

The CRTJOBQ command creates a new job queue. A job queue contains entries for jobs that are to be processed by the system. Some of the commands which manipulate jobs in the queue are Submit Job (SBMJOB), Submit Data Base Jobs (SBMDBJOB), Submit Diskette Jobs (SBMDKTJOB), and Transfer Job (TFRJOB). In FIG. 8A and 8B, the command definitions for both versions of the CRTJOBQ command show the differences. The first change to be noted is that the keyword "job-queue-name" appears after the keyword value "library-name/". Thus, the name of the job queue in the version 1 commands looks like "OBJ.LIB", while in the version 2 command set, the name of the queue looks like "LIB/OBJ". The difference in the name syntax is handled by the different parse routines (124,126) in FIG. 3A.

The default value for the library name is QGPL in version 1 and CURLIB in version 2. Further changes were made in optional keywords and their values. The keyword PUBAUT in version 1 was changed to AUT in version 2. Note that the values were also changed, with only the ALL value being the same between them. The parameters are passed to the command processing program positionally without the keyword names as indicated in FIG. 12. Thus, the keyword names are independent of the command processing program.

Figure 8C:
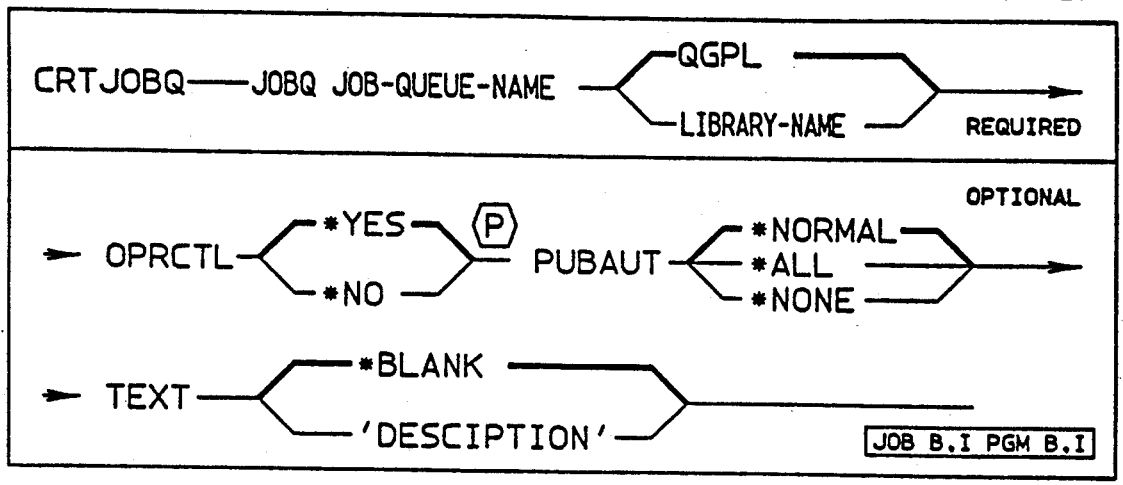
Figure 8D:
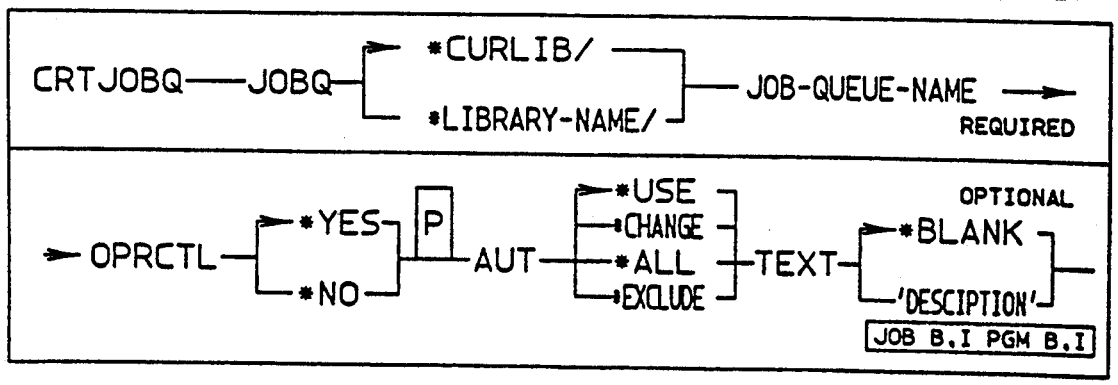

FIG. 8C and 8D show the difference in syntax between the version 1 and version 2 CRTJOBQ command. The default for library changed from QGPL to *CURLIB. Library name convention changed from XXX.lib to lib/xxx. The keyword PUBAUT changed to AUT. Finally, the number of values from PUBAUT to AUT also changed.

Version 1: CLRDKT (Clear Diskette)
Version 2: CLRDKT (Clear Diskette)

A pair of commands having the name CLRDKT (Clear Diskette) are also illustrated in the command definition libraries at 25 and 26 (FIG. 1A) in their respective libraries. While the name is the same for both versions, the parameters are quite different as can be seen in their command definitions in FIG. 9A and 9B. Constants were used in the second version of the command to make the number of parameters compatible for running on command processing program 16C (FIG. 1A). The constants are added at design time, and are transparent to the user. This allows the "LOC and SUFFIX" keywords to be hidden on the second version. In other words, an application, which contains several programs written in version 1 command set will operate without change in a computer having both the version 1 and version 2 command sets.

The version 1 CLRDKT command deletes all files, active and inactive, from one or more diskettes by deleting data file identifiers from the diskette label area on each diskette. In the version 2 command, the keywords LOC and SUFFIX which appear in the version 1 command were dropped. The keyword LOC is given the constant of *S1 (meaning slot 1, a physical location in the computer system) in its internal description in the version 2 library. The keyword SUFFIX is given a constant of *NO in the version 2 command. The command processing program corresponding to the command will expect 5 parameters, DEV, LOC, VOL, CHECK and SUFFIX and therefore these are the five parameters in the command definitions in FIG. 9A and 9B.

FIG. 9C and 9D show the difference in syntax between the version 1 and version 2 CLRDKT command. Keyword DEV only exists in version 2, and keywords LOC and SUFFIX only exist in version 1. Also there are different defaults on VOL keyword. Also note that the constants added in the version 2 command definition FIG. 9B are not visible to the user.

The following is a simplified version of the CLRDKT command for both versions. The use of constants is shown. The "- - -" in Table 1 below shows where user input is allowed.

| Keyword | Version 1 | Version 2 |
|---------|-----------|-----------|
| DEV | CONSTANT-QDKT | — |
| LOC | — | CONSTANT=(*S1 *FIRST *LAST) |
| VOL | — | — |
| SUFFIX | — | CONSTANT=*NO |

The details of what is passed for each parameter are described in the IBM System/38 Programmers Guide (1986) Tenth edition, chapter 14. An example for the CLRDKT command follows below. This example uses the keyword SPCVAL (special value) to identify mapping logic. A special value, mapping logic, shows how external terms are mapped to internal values expected by a program.

SPCVAL((*LAST −5) (*ONLY −3)

When *LAST is specified the program gets a −5.
When *ONLY is specified the program gets a −3.
The command processing program is independent of the words *LAST and *ONLY. The use of special value allows the external terms to change without affecting the application program. All of the mapping of parameters and special values are handled by the command analyzer so that the parameters the command processing program gets are converted values based on the mapping logic.

The example for version 1 of the CLRDKT command follows:

| CLRDKT: | CMD |
|---|---|
| | PARM KWD(DEV) + |
| | TYPE(*NAME) LEN(10) MIN(1) |
| | MAX(1) + |
| | PARM KWD(LOC) + |
| | TYPE(E1) |
| | PARM KWD(VOL) + |
| | TYPE(*CHAR) LEN(8) RSTD(*NO) + |
| | DFT(*MOUNTED) |
| | PARM KWD(CHECK) + |
| | TYPE(*CHAR) LEN(1) |
| | DFT(*YES) SPCVAL((*YES Y) |
| | (*NO N)) |
| | PARM KWD(SUFFIX) + |
| | TYPE(*CHAR) LEN(1) |
| | CONSTANT(*NO) |
| | SPCVAL((*NO N) (*YES Y)) E1 |
| ELEM | TYPE(*CHAR) LEN(5) |
| | CONSTANT(*S1) |
| | ELEM TYPE(*INT2) RSTD(*NO) + |
| | SPCVAL((*FIRST −4)) |
| | CONSTANT(*FIRST) |
| | ELEM TYPE(*INT2) RSTD(*NO) |
| | SPCVAL((*LAST −5) (*ONLY −3) + |
| | CONSTANT(*LAST) |

For version 2 of the CLRDKT command:

| CLRDKT: | CMD |
|---|---|
| | PARM KWD(DEV) + |
| | TYPE(*NAME) LEN(10) + |
| | CONSTANT(QDKT) |
| | PARM KWD(LOC) + |
| | TYPE(E1) |
| | PARM KWD(VOL) + |
| | TYPE(*CHAR) LEN(8) DFT(*LOC) |
| | SPCVAL((*LOC *MOUNTED)) |
| | PARM KWD(CHECK) + |
| | TYPE(*CHAR) LEN(1) + |
| | DFT(*YES) SPCVAL((*YES Y) |
| | (*NO N)) |
| | PARM KWD(SUFFIX) + |
| | TYPE(*CHAR) LEN(1) + |
| | RSTD(*YES) DFT(*NO) |
| | SPCVAL((*NO N) (*YES Y)) E1 |
| ELEM | TYPE(*CHAR) LEN(5) MIN(0) MAX(1) + |
| | VALUES(8M12 *M1 *M2 *S1 *S2 *S3 |
| | *S12 *S23 *S123) |
| | ELEM TYPE(*INT2) RSTD(*NO) + |
| | DFT(*FIRST) RANGE(1 10) |
| | SPCVAL((*FIRST −4)) |
| | ELEM TYPE(*INT2) RSTD(*NO) + |
| | DFT(*LAST) RANGE(1 10) |
| | SPCVAL((*LAST −5) (*ONLY−3) |

Figure 10:
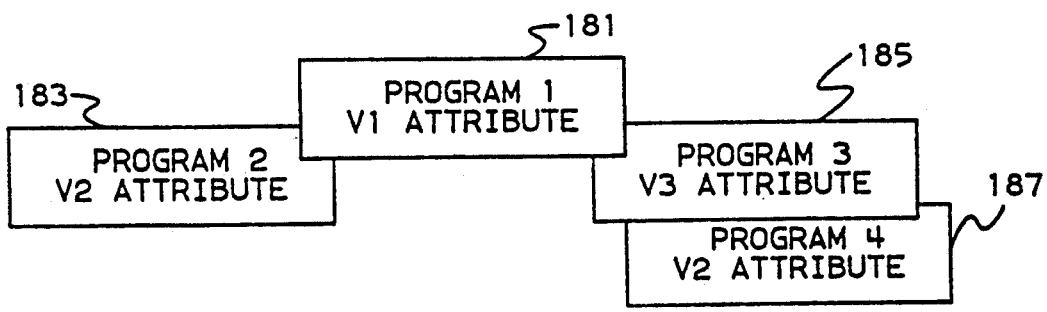
FIG. 10 is a block diagram example of nested programs in application programs which use multiple different versions of system commands.

Referring to FIG. 10, the invention is easily expandable into more than two versions of command sets. Three or more versions can be accommodated by having a large enough program attribute field. The logical arrangement of the versions of libraries permits searching any version library first. Since each program has its own attribute, an application can have programs using many different versions of command sets.

In FIG. 10, an application is shown having an entry program using version 1, at block 181. The entry program can invoke program 183, which has a program attribute indicating that it is a version 2 program. A further program 185 invokable by program 181 is using version 3. Program 185 can itself invoke a program 187 which is written in version 2. There is no conceptual limit to the nesting of programs written in different command sets using the present invention.

A huge financial investment in an application written in version 1 need not be converted to version 2 or 3. It can even have additional programs added to it which are written in a version which contains more advanced function. At the users leisure, the application can be rewritten one program at a time, thus gaining improved performance in steps, rather than revising the entire application all at one time.

What is claimed is:

1. A computer system for executing user programs having different versions of system commands, the computer system comprising:

a command execution means for executing system commands having a format common to all versions;

a library for storing a first version of system commands in the common format;

a library for storing a second version of system commands in the common format;

means for searching said libraries while executing said user programs for system commands invoked by the user programs;

means responsive to the user program for determining the sequence in which said libraries are searched while executing the user program;

said command execution means coupled to receive commands from said libraries for executing common format system commands invoked by said user programs, wherein both version of system commands are executed by the same command execution program executing the respective common format of each system command without regard to the version of the system command invoked by the user program.

2. The computer system of claim 1 wherein the means for determining the sequence in which said libraries are searched comprises:

means for identifying from each program the version of system commands to use in executing the commands of that program; and means responsive to said identifying means for providing version identification to the searching means so that the searching means first searches the library identified by the identifying means.

3. A method for dynamically adapting multiple versions of computer system command to the computer's operating system comprising the steps of:

retrieving from the computer system commands the command character string and option information related to the command to be processed by the operating system;

retrieving a command definition for the command based on said option information, said step of retrieving a command definition being performed at time of command execution;

transforming the command character string in accordance with the command definition into transformed data formatted for command processing, said step of transforming the command character string being performed at tie of command execution; and processing the transformed data with the command processing program assigned to that command and all its version counterparts in order to execute any version of the command.

4. The method of claim 3 wherein said option information includes a version identifier.

5. The method of claim 4 wherein said command definition retrieving step comprises the steps of:
- collecting each version of a command definition in a predetermined version library so that all command definitions for a given version are in a single library;
- detecting the version identifier of a command from the option information; and
- searching the version library identified by the version identifier to retrieve the command definition.

6. The method of claim 5 wherein said searching step further comprises:
- searching multiple libraries in a pre-defined sequence until the command definition is found.

7. The method of claim 3 wherein said command definitions for all counterpart commands in the multiple versions of a command have a predetermined format associated with the command processing step that executes all the counterpart commands.

8. The method of claim 7 wherein the predetermined command definition format has the same number of parameters for all counterpart versions of a command.

9. The method of claim 7 wherein the predetermined command definition format has the same sequence of parameters for all counterpart versions of a command.

10. A method for executing a plurality of system commands written in differing versions of a computer's operating system, aid method comprising the steps of:
- defining a set of system commands in a universal format, wherein each system command on any version of the operating system has a counterpart system command in said set, and wherein at least one command in said set is the counterpart of more than one command in different versions of the operating system;
- invoking a system command to be executed;
- determining the version of the operating system in which the command to be executed is written, said determining step being performed in response to said invoking step;
- transforming the command character string of the command to be executed with a command analyzer into a character string constituting the counterpart of said command in said set of commands in a universal format, said command analyzer being responsive to the version of the operating system in which said command is written, said transforming step being performed after said invoking step; and
- executing the command character string constituting the counterpart of said command to be executed in said set of commands in a universal format.

11. The method for executing a plurality of commands written in differing versions of a computer's operating system of claim 10, wherein said step of transforming the command character string comprises the steps of:
- creating a set of command definitions for each version of the computer's operating system, said set of command definitions having one command definition for each command in said version of the operating system;
- retrieving the command definition of the command to be executed for the version of the operating system in which said command is written; and
- transforming the command character string with a command analyzer in accordance with the command definition into a character string constituting the counterpart of said command in said set of commands in a universal format.

12. The method for executing a plurality of commands written in differing versions of a computer's operating system of claim 10, wherein said step of determining the version of the operating system in which a command to be executed is written comprises associating a version identifier with said command to be executed.

13. The method for executing a plurality of commands written in differing versions of a computer's operating system of claim 12, wherein said step of transforming the command character string comprises the steps of:
- creating a set of command definitions for each version of the computer's operating system, said set of command definitions having one command definition for each command in said version of the operating system;
- collecting each version of command definition in a predetermined version library so that all command definitions for a given version are in a single library;
- detecting the version identifier associated with the command to be executed;
- searching the version library identified by the version identifier to retrieve the command definition; and
- transforming the command character string with a command analyzer in accordance with the command definition into a character string constituting the counterpart of said command in said set of commands in a universal format.

* * * * *